UNITED STATES PATENT OFFICE.

HERMANN PASSOW, OF BLANKENESE, GERMANY.

METHOD OF MAKING FILTERS.

1,027,754.  Specification of Letters Patent.  Patented May 28, 1912.

No Drawing.  Application filed March 31, 1911.  Serial No. 618,145.

*To all whom it may concern:*

Be it known that I, HERMANN PASSOW, a subject of the German Emperor, and residing at Wedeler Chaussee, Blankenese o. Elbe, Kingdom of Prussia, Germany, have invented certain new and useful Improvements in the Method for Making Filters, of which the following is a specification.

If an intimate mixture of kieselguhr, clay and the like with a suitable flux such as salt, fluor-spar, is burned at a high temperature a fritted, porous substance will be produced which forms an excellent filtering material, remarkable for its great strength and its high filtering speed. It must be admitted, that it can only partly retain bacteria out of infected water. The reason for this lies in the fact, that in the aforementioned process the flux will have such an effect on the kieselguhr as to cause the latter to partly fuse whereby its structure will be changed. The capacity of kieselguhr, now however, to afford a bacteria proof filtering material, depends as is well known, on the extremely fine structure of the kieselguhr skeletons of *microscopical Radiolaria*. If the aforementioned burning operation is however carried out at temperatures which will not suffice to completely fuse the filter components, a bacteria proof filtering material will be produced, as the kieselguhr will remain perfectly sound, and this filtering material thus obtained will be extremely brittle and very sensitive toward outward mechanical and physical influences.

The present invention consists in first producing a filtering body by burning the components at a high temperature. Then a further quantity of the compound is applied to or introduced into the thus produced body, whereupon the whole is burned at a lower temperature. By such method plates, sticks and the like can be obtained consisting of layers of a hard and a soft filtering material which, beside its great strength and filtering speed, is absolutely impermeable toward all kind of germs. The same result may be obtained if by suitably varying the ratio of the mixture and selecting the flux the sintering points of the raw mixtures are separated so far from each other, that on the same being heated to a given temperature the one mixture will sinter to a hard clinker like substance under destruction of the kieselguhr structure, while the other will just reach the sintering point.

I claim:

1. A method for making filters consisting in a hard filtering body being burned of a mixture of kieselguhr, clay and the like with a flux to a sintering point, whereupon a soft filtering layer consisting of the same ingredients is applied to the said hard filtering body and the whole is again burned at a temperature below the sintering point.

2. A method for making filters consisting in a hard filtering body being burned of a mixture of kieselguhr, clay and the like with a flux to a sintering point, whereupon a soft filtering layer consisting of the same ingredients is applied to and introduced into the said hard filtering body and the whole is again burned at a temperature below the sintering point.

In testimony whereof I hereto affix my signature in presence of two witnesses.

HERMANN PASSOW.

Witnesses:
 TH. BASHEARS BRYLARD,
 JOSEPH VAN DAM.